April 4, 1961

G. E. FRANCK 2,978,262

TUBE FITTING

Filed Sept. 9, 1957

INVENTOR.
George E. Franck,
BY

United States Patent Office 2,978,262
Patented Apr. 4, 1961

2,978,262

TUBE FITTING

George E. Franck, Riverside, Ill., assignor to The Imperial Eastman Corporation, a corporation of Illinois Filed Sept. 9, 1957, Ser. No. 682,959

4 Claims. (Cl. 285—248)

This invention relates to a fitting and in particular to a fitting for use with thermoplastic tubing.

Because of structural changes in the thermoplastic tubing when exposed to elevated ambient temperatures, such as above 120° F., no completely satisfactory metal fitting for sealingly connecting such tubing under such temperature conditions has heretofore been found in the art. A basic problem in such fittings is that the tubing tends to slip out from the fitting and/or lose its proper seal therewith. Such tubing is used extensively for conducting corrosive liquids due to the stable chemical characteristics of thermoplastics, and separation of the tubing from the fitting or loss of a seal therewith where the tubing is conducting such corrosive liquid is obviously a serious problem.

A principal object of this invention is to provide a new and improved fitting for connecting thermoplastic tubing.

Another object is to provide such a fitting which will maintain a sealing connection with thermoplastic tubing over a substantial range of temperatures.

A further object is to provide such a fitting having new and improved means for positively retaining the tubing against forces tending to separate the tubing from the fitting.

A still further object of the invention is to provide such a fitting wherein a resilient pressure transmitting means is provided to urge the tubing into sealing contact with the fitting.

Yet another object is to provide such a fitting wherein the fluid being conducted through the tubing is prevented from contacting the resilient element.

Still another object is to provide such a fitting wherein the thermostability characteristics, the hardness characteristics, and the elastic characteristics of the resilient member are coordinated with the pressure producing characteristics of a pressure member to maintain the resilient member in an elastic condition and effect the desired seal of the tubing with the fitting over a substantial range of temperatures.

Other features and advantages of the invention will be apparent from the following description taken in connection with the accompanying drawings wherein.

Figure 1:
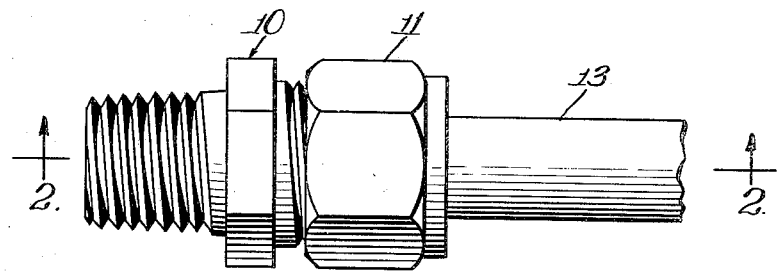
Fig. 1 is an elevational view of a fitting embodying the invention.

In the exemplary embodiment of the invention as disclosed in the drawings, a fitting is shown to comprise a body member 10, a pressure producing member 11 and a pressure transmitting means 12. An important feature of the instant invention is the employment of the pressure transmitting means 12 to transmit resiliently the sealing force necessary to seal the tubing to the body member 10. As means 12 acts resiliently, a change in the characteristics of the tubing 13 is compensatively accommodated whereby the necessary sealing pressure is maintained at elevated temperatures. Another important feature of the instant invention is the provision of positive retaining means on the body member for opposing forces tending to cause the tubing 13 to separate longitudinally from the fitting. The retaining means is cooperatively associated with the pressure transmitting means so as to be operative also at such elevated temperatures.

More specifically, body member 10 is provided with a bore 14 extending completely therethrough. At one end, the bore is defined by a thin walled tubular portion 15 of the body member having substantial longitudinal extent and adapted to receive snugly thereover the end of tubing 13. An annular, radially outwardly opening groove or recess 16 extends longitudinally over a substantial portion of tubular portion 15. At its longitudinal outer end the groove is defined by a radially extending end wall 17 terminating in an outer edge 17a, and at its longitudinally inner end the groove is defined by a beveled end wall 18. Recess 16 is preferably shallow, a satisfactory depth being .004 inch where the tubing 13 is a thermoplastic such as nylon.

A tool engaging portion 10a of conventional arrangement extends annularly around the mid-portion of the body member. As will be made clear hereinafter, portion 10a also serves as an automatic control of the pressure producing member 11.

The pressure producing member 11 comprises an annular nut member having a longitudinally extending portion 19 threadedly associated with the body member, as by interior threads 20 on the longitudinal portion 19 and exterior threads 21 on the body member 10. The internal diameter of longitudinal portion 19 is substantially greater than the external diameter of the tubing 13 whereby an annular space 22 is formed therebetween. To close the longitudinally outer portion of space 22 a radially inwardly extending flange 23 defining the outer end of the pressure producing member is provided with an internal diameter just slightly greater than the external diameter of tubing 13. The longitudinally inner end of space 22 is defined by a radial surface 24 of the body member. At its radially inner portion surface 24 is recessed to define an annular groove 25 contiguous with tubular portion 15. Groove 25 is adapted to receive the end of tubing 13 for improved retention of the tubing on tubular portion 15.

Figure 2:
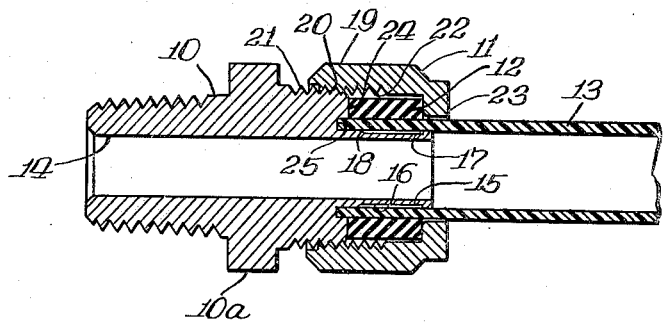
Fig. 2 is a sectional view thereof taken approximately along the line 2—2 of Fig. 1.
Figure 3:
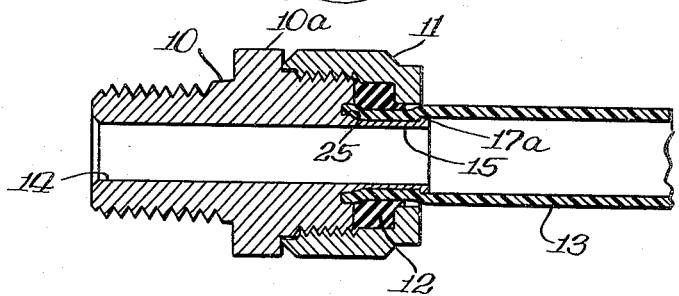
Fig. 3 is a sectional view similar to that of Fig. 2 but with the fitting and tubing shown in the connected arrangement.

As discussed above, a sealing pressure force is transmitted from the pressure producing member 11 against tubing 13 by a pressure transmitting means 12. Means 12 comprises a mass of thermostable resilient material received within space 22. In the illustrated embodiment, means 12 comprises an annular sleeve. As best seen in Figs. 2 and 3, manipulation of member 11 effecting a decrease in the longitudinal extent of space 22 effects a radial constriction of sleeve 12. Sleeve 12 extends in substantial longitudinal alignment with recess 16 so that a radial force is transmitted through the interface of sleeve 12 and tube 13 to press tube 13 firmly into recess 16. As sleeve 12 is constricted, it becomes compressed and applies the radial force in a resilient manner. Thus, the end of tube 13 is firmly, sealingly connected to body member 10 in such a manner that liquid being conducted through tubing 13 does not contact the pressure transmitting sleeve.

As best seen in Fig. 3 the change in volume of space 22 is effected by a longitudinally inward movement of flange 23. As a result of this movement, sleeve 12 is effectively displaced longitudinally inwardly or toward surface 24 of the body member. Such displacement produces two highly desirable effects, namely (1) it urges tubing 13 tightly into groove 25 by virtue of the frictional action of sleeve 12 against the outer surface of the tubing, and (2) it causes the tubing to form around the outer edge 17a of radial end wall 17 while effectively minimizing any tendency of the edge to cut through the tubing, such as would result if the retaining force were directed through the tubing directly at edge 17a. Resultingly, tube 13 is held securely in place over tubular portion 15 and edge 17a serves as a positive lock against longitudinally outward displacement of the tube and the body member.

It is preferred that the material of which sleeve 12 is comprised be thermostable over a substantial range of temperatures. Thus, the material should not appreciatively soften within the temperature range of 65° F. to 275° F. Further, the material should be relatively hard, having an A scale durometer hardness of 75 to 85. Where the tubing 13 is nylon, a fitting comprising a brass body member 10 and pressure producing member 11, and a synthetic rubber pressure transmitting sleeve 12 has been found to be quite satisfactory.

The connection of the fitting and tube is extremely simple. Nut 11 is first moved over the outer end of the tube 13 with flange 23 foremost. Sleeve 12 is next moved over the outer end of the tubing to be received within the nut member. The end of the tubing is then moved over the tubular portion 13 of the body member until it extends into groove 25. The beveled inner end 18 of recess 16 automatically guides the tubing into recess 25 during this operation precluding any catching thereof in recess 16. Member 11 together with sleeve 12 therein is then moved back over tube 13 until threads 20 on member 11 engage threads 21 on the body member. Member 11 is then threadedly advanced onto the body member whereby flange 23 moves toward surface 24 decreasing the volume of space 22. Advancement of member 11 may be continued until it abuts the tool engaging means 10a on the body member whereupon further movement is automatically prevented. The minimum effective volume of space 22 when member 11 is thus fully advanced, is correlated with the characteristics of block 12 so that the block is under substantial compressive force but has not passed its elastic limit. Thus, the block remains resilient and transmits a substantial pressure through the portion of tubing 13 contiguous therewith to press the tubing sealingly against the tubular portion 15 within recess 16. This pressure is sufficient to effect the desirable sealing engagement of the tubing with the body member, and because of the resilient nature of the pressure transmitting means 12, is maintained notwithstanding a change in the physical characteristics of the tubing resulting from a change in the temperature thereof.

The resultant connection is made positive as a result of edge 17a locking the tubing against longitudinal movement. If it is desired to disconnect the tubing for any reason, this may be done simply by unthreading member 11 and withdrawing the tubing end from its position around tubular portion 15. Because of the resilient nature of sleeve 12 the fitting may be reused as desired.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A fitting for use with tubing formed of a thermoplastic material, such as nylon, which deforms at elevated temperatures and which remains deformed upon return to normal ambient temperature, comprising: a body member having a bore completely therethrough and a tubular portion defining one end of the bore provided with a radially outwardly opening annular, relatively shallow recess, said tubular portion having a longitudinally outer end wall extending normal to the axis of the recess, said end wall having a longitudinally inner, radially outer edge defined by the intersection of the longitudinally inner surface of the end wall and the radially outer surface of the tubular portion, the external diameter of the tubular portion including the end wall being substantially equal to the internal diameter of the tubing to be connected; a pressure member adapted to be secured to said body member and having a radially inturned flange thereon, said flange having an inner, annular, axially extending surface the diameter of which approximates the outer diameter of said tube to be connected, said pressure member being movably associated with the body member to define with a body member and tubing arranged concentrically over said tubular portion a variable volume annular space radially outward of said recess; and a mass of thermostable resilient material in said space having an unconstricted volume greater than the minimum effective volume of the space for continuously resiliently transmitting a pressure against the tubing, the volume of said thermostable material and the length of said tubular portion being so proportioned that upon assembly of said tube and said fitting, the outer end wall edge will be located substantially radially inwardly of said axial extending surface of said pressure member and the thermostable material will extrude under said axially extending surface to force said tube into said groove and form the inner wall of said tube around said end wall outer edge, thereby to maintain the tubing in sealed, substantially fixed relationship with the tubular portion of the body member notwithstanding cyclical elevation of the temperature thereof to a high temperature whereat the tubing may yield, and return of the temperature thereof to normal ambient temperature.

2. The fitting of claim 1 wherein the recess has a depth of .004 inch.

3. The fitting of claim 1 wherein said mass of resilient material comprises a ring having an unconstricted inner diameter smaller than the diameter of said axially extending surface of the nut.

4. A fitting for use with tubing formed of a thermoplastic material, such as nylon, which deforms at elevated temperatures and which remains deformed upon return to normal ambient temperature, comprising: a body member having a bore completely therethrough and a tubular portion defining one end of the bore provided with a radially outwardly opening annular, relatively shallow recess, said tubular portion having a longitudinally outer end wall extending normal to the axis of the recess, said end wall having a longitudinally inner, radially outer edge defined by the intersection of the longitudinally inner surface of the end wall and the radially outer surface of the tubular portion, the external diameter of the tubular portion including the end wall being substantially equal to the internal diameter of the tubing to be connected and the depth of said recess being substantially less than one half the thickness of the tubing to be connected; a pressure member adapted to be secured to said body member and having a radially inturned flange thereon, said flange having an inner, annular, axially extending surface the diameter of which approximates the outer diameter of said tube to be connected, said pressure member being movably associated with the body member to define with a body member and tubing arranged concentrically over said tubular portion a variable volume annular space radially outward of said recess; and a mass of thermostable resilient material having a durometer A-scale hardness in the range of approximately 75-85 in said space having an unconstricted volume greater than the minimum effective volume of the space for continuously resiliently transmitting a pressure against the tubing, the volume of said thermostable material and the length of said tubular portion being so proportioned that upon assembly of said tube and said fitting, the outer end wall edge will be located substantially radially inwardly of said axial extending surface of said pressure member and the thermostable material will extrude under said axially extending surface to force said tube into said groove and form the inner wall of said tube around said end wall outer edge, thereby to maintain the tubing in sealed, substantially fixed relationship with the tubular portion of the body member notwithstanding cyclical elevation of the temperature thereof to a high temperature whereat the tubing may yield, and return of the temperature thereof to normal ambient temperature.

References Cited in the file of this patent

UNITED STATES PATENTS

| | | |
|---|---|---|
| 1,980,389 | Dennie | Nov. 13, 1934 |
| 2,414,789 | Anderson | Jan. 28, 1947 |
| 2,464,416 | Raybould | Mar. 15, 1949 |
| 2,467,520 | Brubaker | Apr. 19, 1949 |
| 2,499,024 | Hollyday | Feb. 28, 1950 |
| 2,513,115 | Sprigg | June 27, 1950 |
| 2,768,845 | Samiran | Oct. 30, 1956 |
| 2,821,567 | Bergan | Jan. 28, 1958 |

FOREIGN PATENTS

| | | |
|---|---|---|
| 485,154 | Great Britain | May 16, 1938 |